(12) United States Patent
Douglas

(10) Patent No.: US 9,394,120 B2
(45) Date of Patent: Jul. 19, 2016

(54) MATERIAL SEPARATOR FOR A VERTICAL PNEUMATIC SYSTEM

(71) Applicant: Phillip Douglas, Fredericktown, OH (US)

(72) Inventor: Phillip Douglas, Fredericktown, OH (US)

(*) Notice: Subject to any disclaimer, the term of this patent is extended or adjusted under 35 U.S.C. 154(b) by 0 days.

(21) Appl. No.: 14/998,369

(22) Filed: Dec. 24, 2015

(65) Prior Publication Data

US 2016/0137432 A1    May 19, 2016

Related U.S. Application Data

(60) Division of application No. 14/545,885, filed on Jul. 1, 2015, which is a continuation-in-part of application No. 13/999,396, filed on Feb. 21, 2014.

(60) Provisional application No. 61/850,770, filed on Feb. 23, 2013.

(51) Int. Cl.
| | |
|---|---|
| *B65G 53/60* | (2006.01) |
| *B65G 53/34* | (2006.01) |
| *F16M 13/02* | (2006.01) |
| *B65G 53/40* | (2006.01) |

(52) U.S. Cl.
CPC .............. *B65G 53/60* (2013.01); *B65G 53/34* (2013.01); *B65G 53/40* (2013.01); *F16M 13/02* (2013.01)

(58) Field of Classification Search
USPC .......... 406/163, 175, 179, 174, 197; 110/310; 111/175, 176; 414/299; 248/599, 601
See application file for complete search history.

(56) References Cited

U.S. PATENT DOCUMENTS

| | | | | |
|---|---|---|---|---|
| 521,619 | A * | 6/1894 | Jordan ................... | A01K 97/10 248/230.5 |
| 666,113 | A * | 1/1901 | Schwickart ............. | F24C 3/002 110/297 |
| 956,393 | A * | 4/1910 | Mechling ............... | F16B 1/0057 248/227.3 |
| 1,380,698 | A | 6/1921 | Anspach et al. | |
| 1,671,706 | A * | 5/1928 | Evans ..................... | E21F 1/04 138/106 |
| 1,861,295 | A | 5/1932 | Bramwell | |
| 1,960,797 | A * | 5/1934 | Sackett .................. | B65G 69/10 222/464.1 |
| 2,003,159 | A * | 5/1935 | Taylor .................... | B65G 51/18 248/62 |

(Continued)

FOREIGN PATENT DOCUMENTS

FR    1108436    1/1956

OTHER PUBLICATIONS

A. Bhatia, "Pneumatic Conveying Systems", Course No. M05-010, Continuing Education and Development, Inc., Stony Point, New York, pp. 1-57 esp. 16-18; no date.

*Primary Examiner* — Joseph Dillon, Jr.
(74) *Attorney, Agent, or Firm* — Andrew C. Pike

(57) ABSTRACT

A delivery system deposits granular material being pneumatically conveyed within an entraining airflow to sequentially fill a storage silo from bottom to top. The delivery system has a series of vertical tubes and separators for conveying the entrained material upwardly from the bottom to the top of the silo. Each separator automatically selectively either separates the entrained material, by choking the airflow entraining the material within an outlet tube thereof, and automatically deposits the separated material through an outlet thereof; or else flows therethrough the entrained material without separation. A support system comprises a vertical support that vertically suspends and centers the delivery system within the silo and reinforces the silo, and a horizontal support that selectively supports the delivery system upon the silo floor.

12 Claims, 7 Drawing Sheets

(56) References Cited

U.S. PATENT DOCUMENTS

| | | | |
|---|---|---|---|
| 2,010,128 A | 8/1935 | Arnold | |
| 2,371,152 A * | 3/1945 | Coates | A01M 25/00 406/155 |
| 2,395,410 A * | 2/1946 | Kaesler | B65G 41/002 123/198 R |
| 2,591,040 A | 4/1952 | Bartow | |
| 2,641,335 A | 6/1953 | Berg | |
| 2,643,161 A | 6/1953 | Shirk | |
| 2,695,197 A | 11/1954 | Burtis | |
| 2,697,640 A | 12/1954 | Newman | |
| 2,704,229 A | 3/1955 | Snow | |
| 2,717,181 A | 9/1955 | Snow | |
| 2,767,031 A | 10/1956 | Huffman | |
| 2,813,757 A | 11/1957 | Shirk | |
| 2,819,124 A | 1/1958 | Bergstrom | |
| 2,873,144 A | 2/1959 | Bergstrom et al. | |
| 2,873,146 A | 2/1959 | Cross, Jr. et al. | |
| 2,873,147 A | 2/1959 | Payne et al. | |
| 2,875,968 A * | 3/1959 | Ekola | A47G 33/12 248/165 |
| 2,880,037 A | 3/1959 | Drew | |
| 2,880,038 A | 3/1959 | Bergstrom et al. | |
| 2,887,341 A | 5/1959 | Cross, Jr. | |
| 2,942,820 A * | 6/1960 | Sherburne | F16L 3/00 248/62 |
| 2,945,724 A | 7/1960 | McClure | |
| 3,083,064 A | 3/1963 | McClure | |
| 3,115,370 A | 12/1963 | Cross, Jr. | |
| 3,206,905 A * | 9/1965 | Wavering | C04B 20/06 248/206.5 |
| 3,652,131 A | 3/1972 | Carlsson | |
| 3,675,796 A * | 7/1972 | Atkinson | A01F 25/186 406/167 |
| 3,799,621 A | 3/1974 | Kramer | |
| 3,854,637 A | 12/1974 | Muller, Jr. et al. | |
| 3,861,059 A | 1/1975 | Lindemann et al. | |
| 3,874,860 A | 4/1975 | Larsson | |
| 4,005,016 A * | 1/1977 | Haese | B01D 33/0096 210/268 |
| 4,063,700 A * | 12/1977 | Brewer | F01N 13/1805 24/277 |
| 4,082,364 A | 4/1978 | Krambrock | |
| 4,097,243 A | 6/1978 | Bartholic | |
| 4,240,772 A | 12/1980 | Wyatt | |
| 4,413,939 A * | 11/1983 | Peris | B23B 13/12 198/747 |
| 4,478,517 A | 10/1984 | Hoppe et al. | |
| 4,591,075 A * | 5/1986 | Eriksson | B65D 88/72 222/195 |
| 4,603,769 A | 8/1986 | Bach et al. | |
| 4,657,667 A | 4/1987 | Etkin | |
| 4,834,544 A | 5/1989 | Paul | |
| 4,874,130 A | 10/1989 | Wondergem | |
| 4,978,227 A | 12/1990 | Paul | |
| 4,995,966 A | 2/1991 | Ofner | |
| 5,101,847 A * | 4/1992 | Oribe | F24F 7/06 137/1 |
| 5,163,786 A | 11/1992 | Christianson | |
| 5,184,730 A | 2/1993 | Paul | |
| 5,379,706 A | 1/1995 | Gage et al. | |
| 5,584,615 A | 12/1996 | Micklich | |
| 6,202,854 B1 | 3/2001 | Krieser et al. | |
| 6,227,357 B1 * | 5/2001 | Brown, Sr. | B25H 1/04 198/861.1 |
| 6,269,955 B1 | 8/2001 | Morimoto et al. | |
| 6,632,063 B1 | 10/2003 | Karlsen et al. | |
| 6,712,216 B2 | 3/2004 | Van Oirschot | |
| 6,845,867 B2 * | 1/2005 | Sussegger | B07B 4/04 209/135 |
| 6,889,843 B1 * | 5/2005 | Longhurst | B07B 9/02 209/135 |
| 6,892,748 B2 * | 5/2005 | Junier | F16K 51/00 134/102.1 |
| 7,588,061 B2 * | 9/2009 | Poussin | B01J 8/002 141/286 |
| 7,712,611 B2 * | 5/2010 | Longhurst | B07B 9/02 209/137 |
| 8,684,636 B2 | 4/2014 | Dunstan | |
| 8,690,488 B2 | 4/2014 | Jagow et al. | |
| 8,770,537 B2 * | 7/2014 | Go | E02F 9/2275 212/347 |
| 8,821,078 B2 | 9/2014 | Hockett et al. | |
| 8,876,439 B2 | 11/2014 | Sheehan | |
| 2003/0077128 A1 | 4/2003 | Williams et al. | |
| 2007/0228078 A1 | 10/2007 | Sanders | |
| 2012/0042970 A1 | 2/2012 | Klages et al. | |
| 2013/0098480 A1 | 4/2013 | Chyou et al. | |
| 2013/0209182 A1 | 8/2013 | Sundholm | |
| 2013/0247803 A1 | 9/2013 | Heintzman | |
| 2013/0284644 A1 | 10/2013 | Baetz et al. | |
| 2014/0124339 A1 * | 5/2014 | Murphy | B02C 21/026 198/861.1 |
| 2014/0202552 A1 * | 7/2014 | Sixsmith | E03B 7/045 137/15.01 |
| 2014/0341698 A1 * | 11/2014 | Franco | F16M 11/24 414/800 |
| 2015/0107502 A1 | 4/2015 | Riffel | |

* cited by examiner

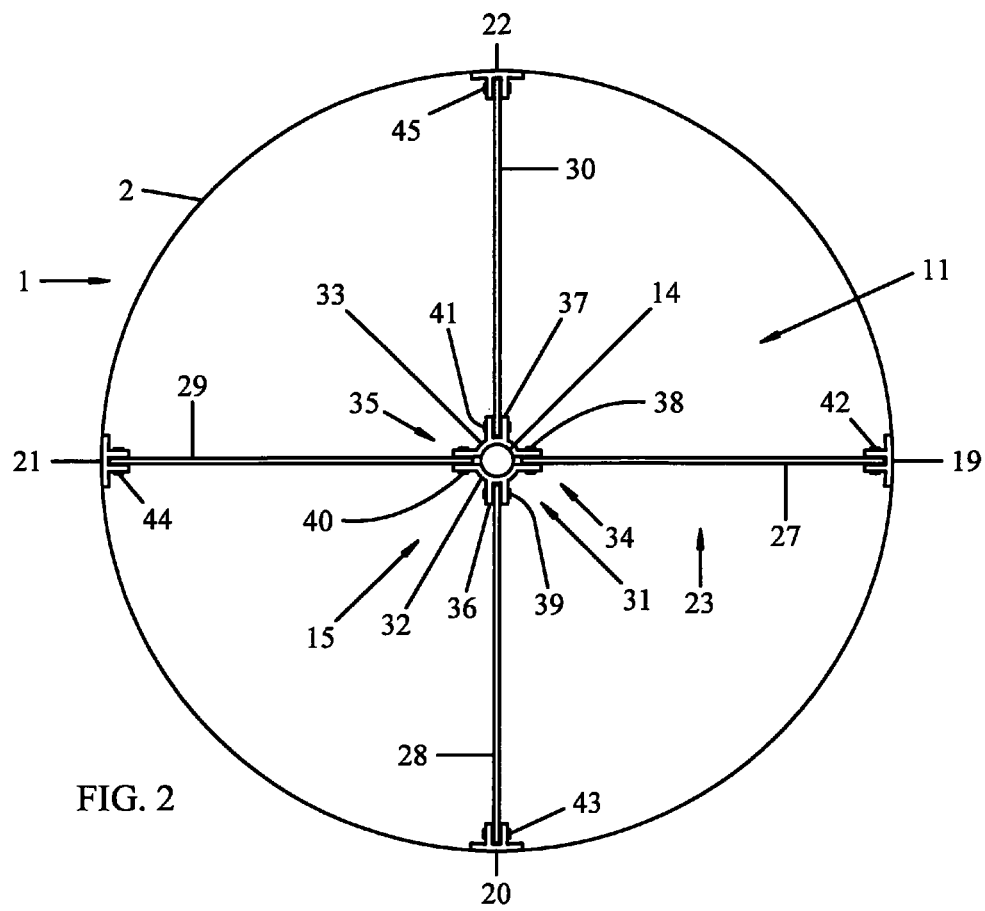
FIG. 2
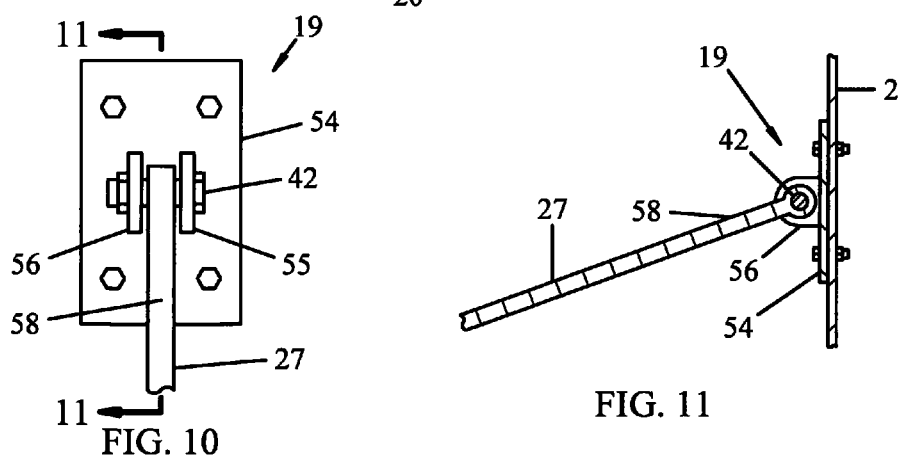
FIG. 10
FIG. 11

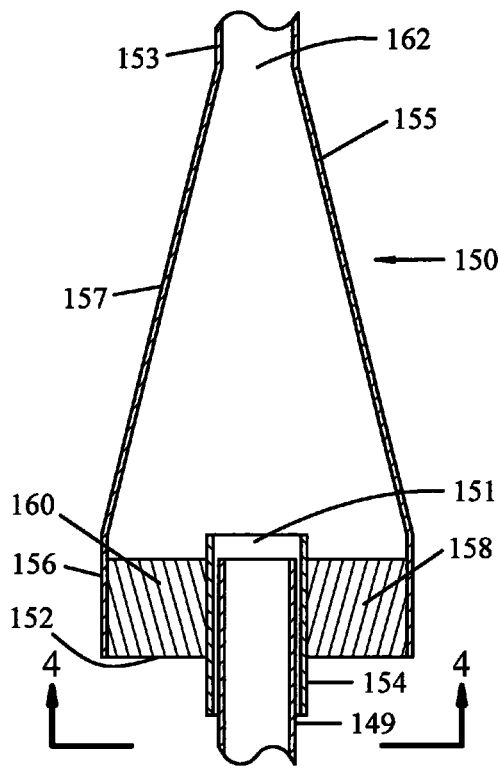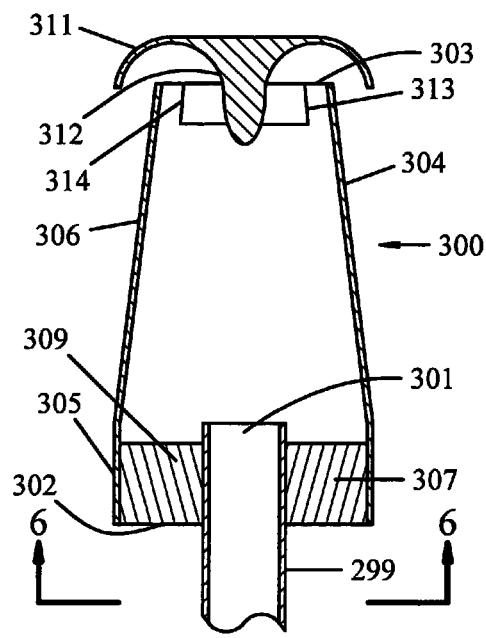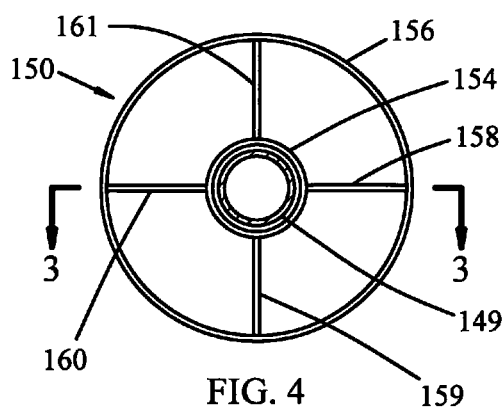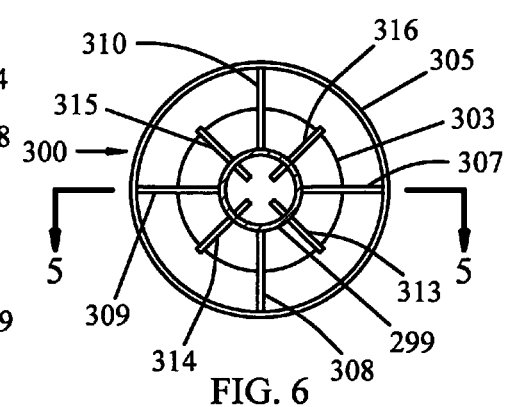

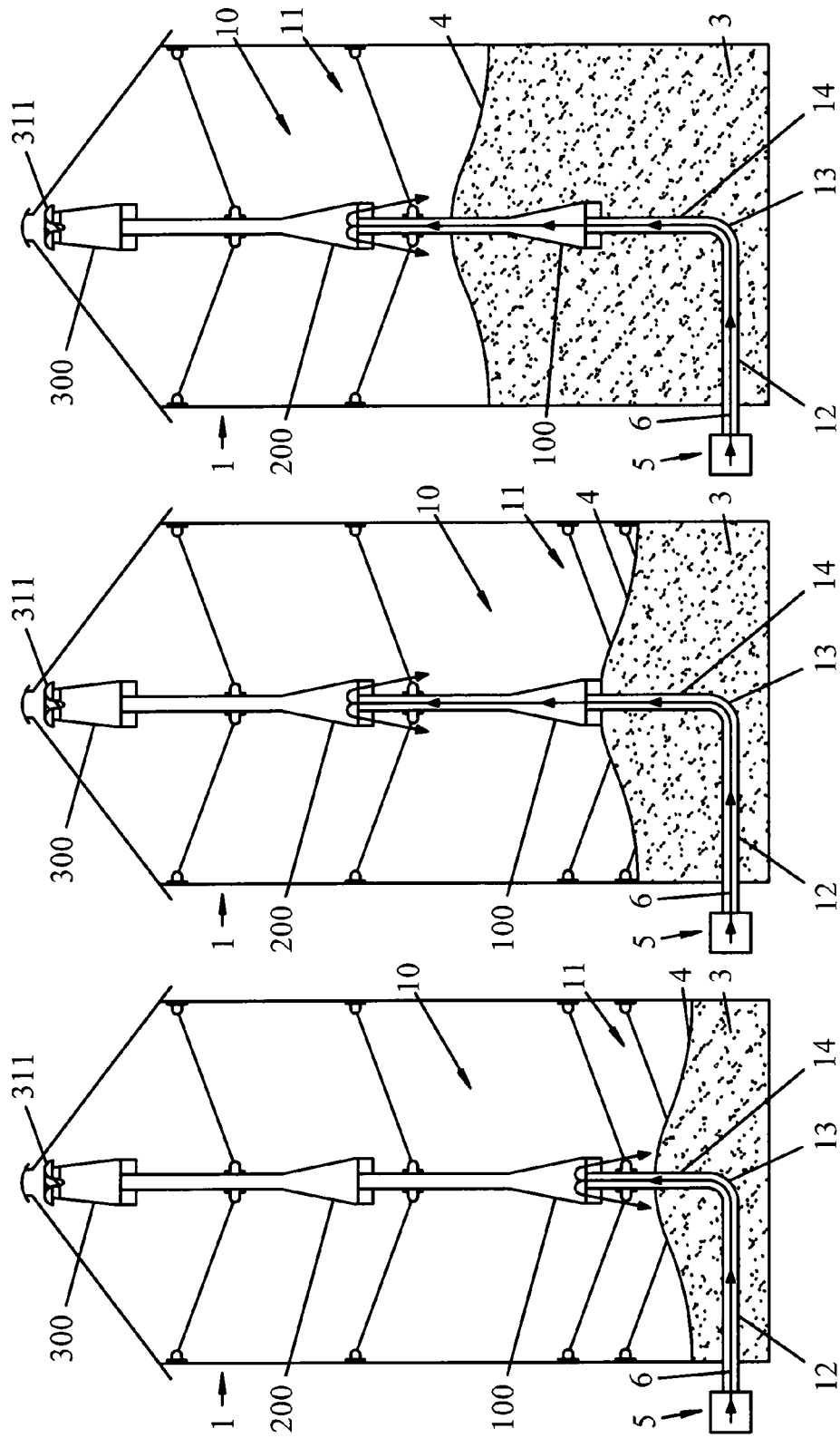

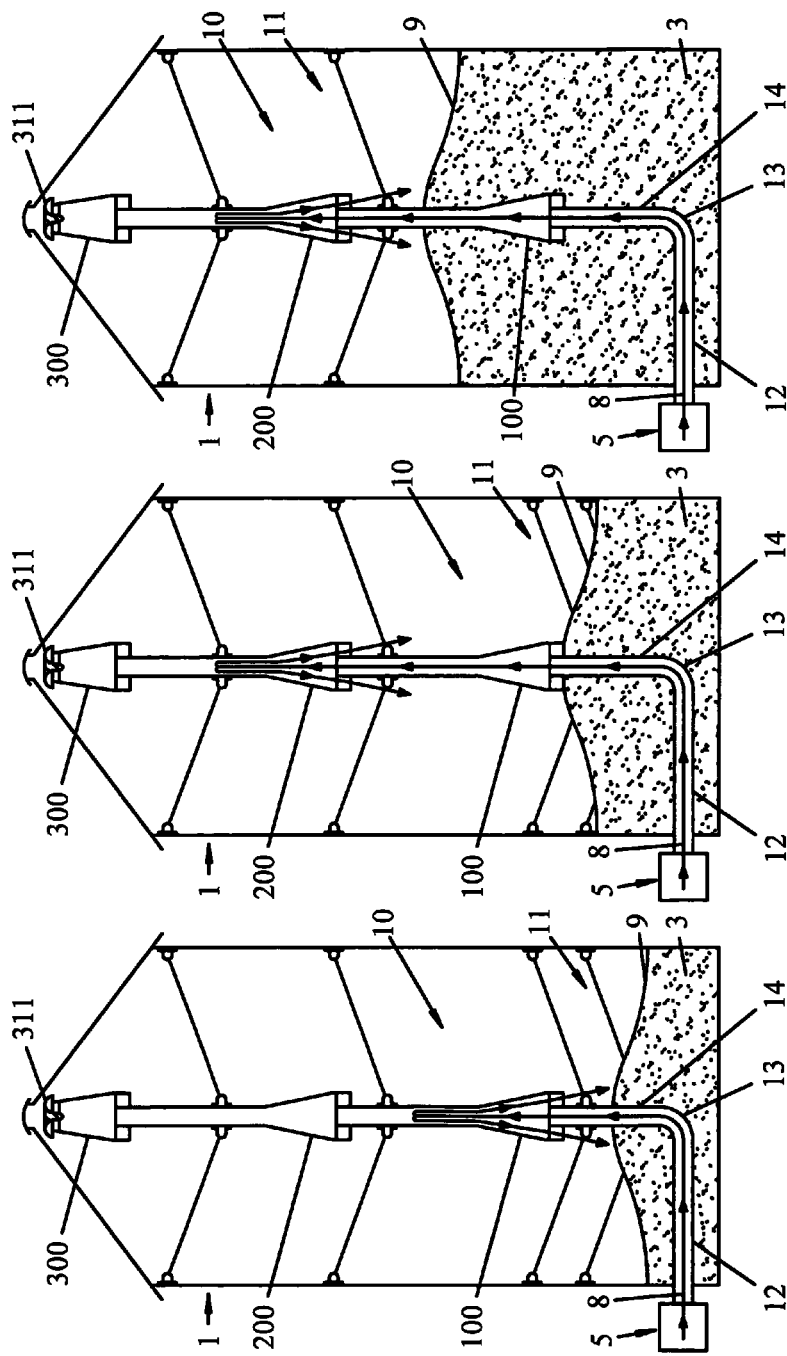

MATERIAL SEPARATOR FOR A VERTICAL PNEUMATIC SYSTEM

CROSS-REFERENCE TO RELATED APPLICATIONS

This application is a divisional of application Ser. No. 14/545,885 filed Jul. 1, 2015, which is a continuation-in-part of application Ser. No. 13/999,396 filed Feb. 21, 2014, which claims the benefit of provisional application No. 61/850,770 filed Feb. 23, 2013, now abandoned, all of which are incorporated by reference.

BACKGROUND OF THE INVENTION

1. Field of the Invention

The present invention relates to the delivery of material being transported by a conveyor entraining the material within a flow of fluid, and in particular to the depositing of granular material by a pneumatic conveyor into a storage silo.

2. Background Art

Fluid flow conveyors, particularly pneumatic conveyor systems, have become a popular alternative to augers and belt conveyors for the movement of granular materials. Pneumatic conveyor systems are especially suitable for farm grains for the following reasons: grain is carried within a stream of air for less grain damage; a pneumatic conveyor is more economical to install; a pneumatic conveyor is more versatile for multiple silos and multiple silo types at a storage facility; pneumatic conveyors are sealed against water and pest infiltration between receiving point to delivery of the grain; one pneumatic conveyor system can be utilized to move a variety of grain types without cross contamination, simply by turning a valve distributor between silos; and pneumatic conveyor systems are easier to maintain.

Prior art pneumatic conveyor systems delivering grain to the top of storage silos introduce problems for these systems: a cyclone separator is required for the top of each silo; the entire system is exterior of the silo, exposing the machinery to weather-related damage; exterior supports that may be expensive must be used to support the pneumatic conveyor tubing; roof-mounted supports for the pneumatic conveyor and separator exert forces that tend to pull down the silo and collapse it; much of the pneumatic conveyor system is high above ground and not easily serviced; grain-to-grain damage occurs due to the falling of grain from the silo top to the bottom of the silo, which only increases with the height of the silo; and mixed granular materials experience product separation when dropped from the top of a silo.

Furthermore, an efficiency loss of approximately ten percent for every twenty-five feet (seven and one-half meters) of vertical rise is common to all pneumatic conveyor systems. For example, a pneumatic conveyor system used to fill a silo one hundred feet (thirty meters) tall would operate at 40% less than full efficiency (100 ft×(10%/25 ft)=40% loss; 30 m×(10%/7.5 m)=40% loss).

U.S. Pat. No. 4,082,364, Apr. 4, 1978, to Krambrock describes a method for sequentially filling a series of receiving stations from the tops thereof using a pneumatic conveyor, wherein each station is filled until the surface of the deposited material therewithin is just below the inlet thereof from the pneumatic conveyor and then this surface acts as a deflecting surface to direct the airflow entraining the material onto the next station.

U.S. Pat. No. 1,380,698, Jun. 7, 1921, to Anspach et al. discloses a multistage cyclone separator for a pneumatic conveyor depositing separated material to the same destination, wherein the multistage cyclone separator has at least a lower, upstream cyclone separator and an upper, downstream cyclone separator, and wherein the cyclone separators each has a horizontal inlet aperture through which the air entraining the material horizontally enters therewithin and a helical tube for continuously separating the material from the conveying air simultaneously in all of the cyclone separators.

U.S. Pat. No. 6,632,063, Oct. 14, 2003, to Karlsen et al. describes a system for reducing material segregation between finer and coarser material during filling of a silo from its top by controlling the entraining airflow to be a minimum, wherein the material within the silo as it is being filled can eventually reach the level of the outlet of the system for the material.

U.S. Pat. No. 4,603,769, Aug. 5, 1986, to Bach et al. describes a vertical chute for reducing grain dust with a series of vertically aligned outlets for filling a silo from its top, wherein the deposited grain blocks each outlet sequentially from lower to upper as the silo is filled.

The article *Pneumatic Conveying Systems*, course No. M05-010, no date, by A. Bhatia of Continuing Education and Development, Inc. discusses the present state of the art of pneumatic conveyors; and defines "choking" as the settling out downwardly of the entrained material from the entraining airflow when the airflow is flowing upwardly vertically in vertically oriented conveying piping, particularly before reaching the conveyor's destination and thus is to be avoided.

SUMMARY OF THE INVENTION

An objective of the present invention is to remove a major source of contamination into storage silos due to pneumatic conveyor systems by eliminating rooftop delivery of the material by the pneumatic conveyor.

Another objective is to reduce the expense of pneumatic conveyor systems by eliminating the components for rooftop delivery such as a cyclone separator and exterior supports for the pneumatic tubes.

Another objective is to increase the ease of maintenance of pneumatic conveyor systems by routing the pneumatic tubes connected to a storage silo near ground level.

Another objective is to protect the delivery system for a storage silo connected to a pneumatic conveyor from weather-related damage by locating and supporting the delivery system within the silo.

Another objective is to reduce grain-to-grain damage, and also product separation of mixed granular materials, by reducing the height through which the materials drop when deposited within a storage silo.

Another objective is to reinforce a storage silo against collapse due to the added weights and forces of the delivery system and the granular material when stored within the silo.

Another objective is to more evenly distribute the supported weight and forces of the delivery system for a storage silo and the granular material when stored within the silo, while also providing for an unobstructed floor area for mechanical or manual sweeping of the silo floor.

The delivery system of the present invention delivers material being transported by a conveyor entraining the material within a flow of fluid. The system comprises a tube for receiving the fluid flow entraining the material, separators for selectively separating the material from the fluid flow, and a support for vertically suspending the system within a storage silo. The tube, the separators, and the support are all within the silo.

Each separator functions selectively in either one of two modes of operation: either separating the material from the fluid flow, or else flowing the fluid flow entraining the material through the separator without separating. Each separator comprises an inlet, means for selectively separating the material from the fluid flow, a outlet for depositing the material from the selectively separating means, an outlet tube, wall, and a through aperture between the wall and the outlet tube. For each separator, the separator, the inlet, the outlet, the through aperture, and the outlet tube are coaxial.

The selectively separating means comprises means for choking the fluid flow entraining the material within the separator thereof, and means for selectively flowing the separated material through the outlet thereof. The choking means comprises the receiving tube and the separator being vertically oriented with the outlet tube thereof being above the inlet and the outlet thereof. In one embodiment to be used with a relatively lower pressure of the fluid, the choking occurs within a generally conical volume within the separator between the inlet and the outlet tube thereof. In another embodiment to be used with a relatively higher pressure of the fluid, the choking occurs within a generally cylindrical volume within the separator within the outlet tube thereof.

The selectively separating means selectively separates the material from the fluid flow within the separator thereof only when the selectively flowing means is selectively flowing the material through the outlet thereof, depositing the separated material into the silo, creating a mound of the separated material having a surface. The material selectively flows through the outlet until the mound surface blocks the outlet thereof, stopping the selectively flowing and thus stopping the selectively separating of the separator thereof automatically. The fluid flow entraining the material is thus reestablished to go through the separator without separating the material.

The support suspends the system vertically within the silo from bottom to top, wherein the next separator that is downstream is located above the preceding separator that is upstream thereof, respectively. The support has a vertical support that suspends and centers the system within the silo, and a horizontal support that selectively supports the system upon the silo floor. The vertical support comprises clamp assemblies, a set of braces for each respective clamp assembly, and wall brackets connected to the respective braces for connecting to a wall of the storage silo, reinforcing the silo wall within the silo against collapse. Each clamp assembly comprises two equal halves each having two ends and an outer side, a flange for each end wherein the flanges of adjacent ends form end brackets, at least one bracket for each side, and connectors connecting the brackets to the braces, respectively.

One method of the present invention comprises flowing the fluid flow entraining the material into a separator, selectively separating the material from the fluid flow within the separator within the outlet tube thereof, and depositing the selectively separated material out of the separator. The selectively separating comprises choking the fluid flow entraining the material within the separator within the outlet tube thereof. The depositing forms a mound of the material. The method further comprises stopping the selectively separating and the depositing, reestablishing the fluid flow entraining the material through the separator, flowing the fluid flow entraining the material into a downstream separator that is downstream of the separator, selectively separating the material from the fluid flow within the downstream separator, and depositing that selectively separated material out of the downstream separator onto the mound of the material.

Thus, the present invention automatically sequentially fills a storage silo as initially an upstream separator selectively separates the material onto the mound of separated material that is being formed within the silo until the surface of the mound blocks the outlet thereof and stops the selectively separating of that upstream separator, and then subsequently a separator that is downstream of that upstream separator selectively separates the material onto the mound, and so continues for all of the separators until the silo is filled.

The present invention reduces the average drop height of the separated material. This reduces grain-to-grain damage and also product separation of mixed granular materials. The reduction in average drop height of the separated material also increases the efficiency of the pneumatic conveyor system. Whereas a prior art pneumatic conveyor system having rooftop delivery of the material typically would have, for example, for a one-hundred-foot (thirty-meter) high silo a 40% loss of efficiency (as hereinbefore stated), the present invention with four separators bottom to top for the same silo would have a calculated loss of only 25% ((10%+20%+30%+40%)/4)=25%). This is an increase of delivery efficiency by fifteen percentage points, or 25% (((100%−25%)−(100%−40%))/(100%−40%)=125%).

An additional advantage of the present invention over the prior art is the simplicity of operation, with the separators acting automatically and with no moving parts being required for the delivery system.

BRIEF DESCRIPTION OF THE DRAWINGS

FIG. 2 is a schematic bottom view of the embodiment of the present invention, as shown in FIG. 1, showing one clamp assembly, and braces and wall brackets of the vertical support.

FIG. 3 is a cross-sectional view, partly broken, taken on line 3-3 in FIG. 4 of one embodiment of a separator that is not a top separator.

FIG. 4 is a cross-sectional view taken on line 4-4 in FIG. 3.

FIG. 5 is a cross-sectional view, partly broken, taken on line 5-5 in FIG. 6 of one embodiment of a top separator.

FIG. 6 is a cross-sectional view taken on line 6-6 in FIG. 5.

FIG. 10 is a front view, partly broken, of one embodiment of a wall bracket and a brace of the vertical support.

FIG. 11 is a cross-sectional view, partly broken, taken on line 11-11 in FIG. 10.

FIG. 13 is a schematic view of the embodiment of the present invention, as shown in FIG. 1, showing the upstream separator in one embodiment of operation, as shown in FIG. 12, separating the material from the airflow during the sequential filling of the silo.

FIG. 14 is a schematic view of the sequential filling of the silo, as shown in FIG. 13, showing the upstream separator stopping the separation thereof and reestablishing the flowing of the airflow entraining the material therethrough, without separating, onto the downstream separator for separating the material.

FIG. 15 is a schematic view of the sequential filling of the silo, as shown in FIG. 14, showing the downstream separator in one embodiment of operation, as shown in FIG. 12, separating the material from the airflow onto the material that had been separated by the upstream separator.

FIG. 17 is a schematic view of the embodiment of the present invention, as shown in FIG. 1, showing the upstream separator in another embodiment of operation, as shown in FIG. 16, separating the material from the airflow during the sequential filling of the silo.

FIG. 18 is a schematic view of the sequential filling of the silo, as shown in FIG. 17, showing the upstream separator stopping the separation thereof and reestablishing the flowing of the airflow entraining the material therethrough, without separating, onto the downstream separator for separating the material.

FIG. 19 is a schematic view of the sequential filling of the silo, as shown in FIG. 18, showing the downstream separator in another embodiment of operation, as shown in FIG. 16, separating the material from the airflow onto the material that had been separated by the upstream separator.

DETAILED DESCRIPTION OF THE INVENTION

Figure 1:
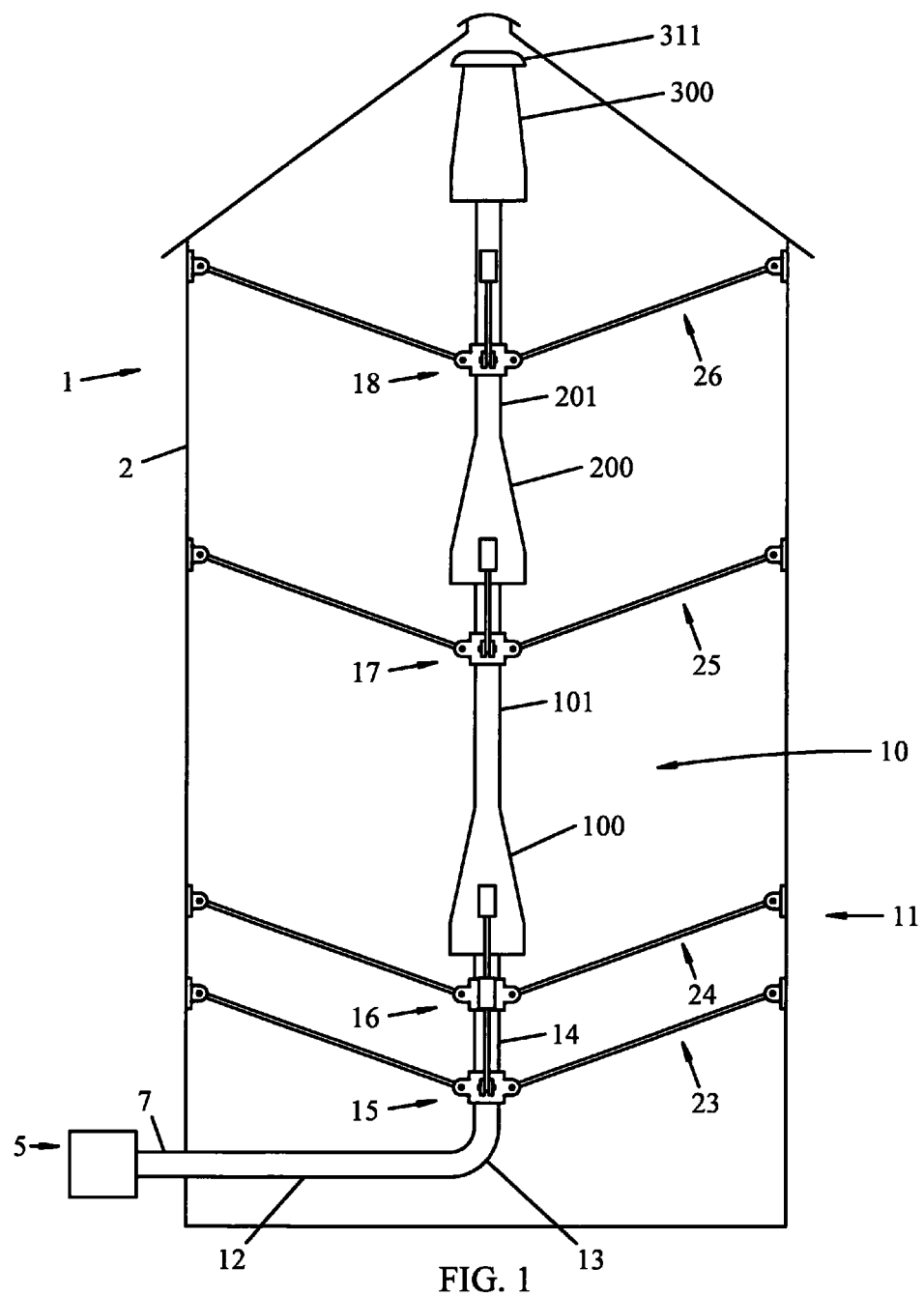
FIG. 1 is a schematic side view of one embodiment of the present invention supported within a storage silo comprising an upstream separator, a downstream separator, a top separator, and a vertical support comprising four clamp assemblies with braces and wall brackets.

The present invention is supported within a vertical storage silo 1 having a wall 2 as shown schematically in FIG. 1. The silo 1 is for the removable storage of granular material 3, for example grain, that, when so stored, has a material surface 4 as shown in FIG. 13, FIG. 14, and FIG. 15. Although the present invention is contemplated primarily for grain, the intent of the claimed invention is to be construed to include all manner of granular material. Pelletized food products, fuels, coal, animal feeds, plastics, and fiber products are a few of the other items suitable for pneumatic conveying for removable storage.

The present invention delivers the material 3 to the silo 1 when the material is transported by a conveyor entraining the material within a flow of fluid. One embodiment of the present invention is contemplated to be used with a conventional pneumatic conveyor system that entrains the material within a flow of air for depositing the material 3 into the silo 1.

A conventional pneumatic charging system is shown generally in FIG. 1 as pneumatic conveyor 5. Pneumatic conveyor 5 is known in the art. Typically, a blower (not shown) supplies a flow of air to a rotary airlock (not shown). The rotary airlock entrains the material 3 to be conveyed into the airflow creating a pneumatic material flow 6 that is a mixture of the airflow entraining the conveyed material to be propelled toward the silo 1. The pneumatic conveyor 5 connects to a tube 7 for conveying of the pneumatic material flow 6. The tube 7 is a pneumatic transfer tube known in the art.

The present invention comprises an outlet of the pneumatic conveyor 5. One embodiment of the present invention is shown schematically in FIG. 1 and FIG. 2 as, generally, a delivery system 10. The delivery system 10 comprises a series of tubes and separators within the silo 1. A vertical support 11 of the delivery system 10 suspends and centers the delivery system 10 within the silo 1, and reinforces the silo 1 against collapse. The tube 7 connects to a horizontal tube 12 of the delivery system 10 for conveying the pneumatic material flow 6 into the silo 1. The horizontal tube 12 may be slightly angled from being exactly horizontal, either upwardly or downwardly, to improve and maintain the pneumatic material flow 6 to provide maximum conveyance of the material. The horizontal tube 12 enters the silo 1 through a lower portion of the silo wall 2. An elbow 13 interconnects the horizontal tube 12 and a vertical tube 14 for conveying the pneumatic material flow 6 upwardly within the silo 1. Alternatively, the tube 7 could connect directly through the silo floor to either the elbow 13 or the vertical tube 14, in which case the horizontal tube 12 would not be included in the delivery system 10. The vertical tube 14 is located at and along the vertical center of the silo 1 as shown in FIG. 2. A clamp assembly 15 of the vertical support 11 is positioned on the vertical tube 14 near the elbow 13.

The vertical support 11 includes a plurality of clamp assemblies, and in particular, for the embodiment shown in FIG. 1, the clamp assembly 15 and also clamp assemblies 16, 17, and 18. As shown in FIG. 2, the vertical support 11 further includes wall brackets 19, 20, 21, and 22 on the silo wall 2, and a set 23 of braces 27, 28, 29, and 30 interconnecting the clamp assembly 15 with the wall brackets 19, 20, 21, and 22 on the silo wall 2, respectively, thereby suspending and centering the vertical tube 14 within the silo 1. Sets 24, 25, and 26 of braces also interconnect the clamps assemblies 16, 17, and 18, respectively, with wall brackets. The silo wall 2 is thus interconnected throughout and within the silo 1 by the vertical support 11, specifically, for the embodiment shown in FIG. 1 and FIG. 2, the clamp assemblies 15, 16, 17, and 18, the sets 23, 24, 25, and 26 of the braces, and the respective wall brackets therefor, simultaneously reinforcing the silo wall 2 against collapse of the silo 1 as well as supporting the delivery system 10.

The clamp assembly 15 includes a clamp 31. As shown schematically in FIG. 2, clamp 31 has two equal half clamps 32 and 33 mounted on and clamping around the vertical tube 14. The clamp 31 has end brackets 34 and 35, each at adjacent ends of the half clamps 32 and 33, and one or more side brackets 36 and 37 on each side of the half clamps 32 and 33.

The braces 27, 28, 29, and 30 are evenly spaced around the vertical tube 14; and are connected at one end thereof to the end bracket 34, the side bracket 36, the end bracket 35, and the side bracket 37, respectively, by fasteners or bolts 38, 39, 40, and 41, respectively, as connectors and are secured, as by nuts when bolts are used. The wall brackets 19, 20, 21, and 22 are evenly spaced on, and connected to, the inner surface of the silo wall 2 on a horizontal plane above the height of the clamp assembly 15. Opposite ends of the braces 27, 28, 29, and 30 are connected to the wall brackets 19, 20, 21, and 22, respectively, by fasteners or bolts 42, 43, 44, and 45, respectively, and are secured, as by nuts when bolts are used, thereby equally connecting the brackets of the clamp 31 to the silo wall 2. The braces 27, 28, 29, and 30 each has a length equal to or greater than the radius of the silo 1, and extend radially upwardly and outwardly from the clamp assembly 15 to the wall brackets 19, 20, 21, and 22.

The vertical tube 14 is connected to an upstream separator 100 of the delivery system 10 by slipping into the upstream separator 100. The clamp assembly 16 of the vertical support 11 is positioned, in the embodiment shown in FIG. 1, on the vertical tube 14 near the upstream separator 100 for suspending and centering the vertical tube 14 within the silo 1. The upstream separator 100 comprises a vertical tube 101 for conveying the pneumatic material flow 6 upwardly from the upstream separator 100. The upstream separator 100 selectively either separates the material from the airflow and deposits the separated material 3 into the silo 1; or else flows the pneumatic material flow 6 through the upstream separator 100, without separating the material from the airflow, and into the vertical tube 101.

In the embodiment shown in FIG. 1, the vertical tube 101 is connected to a downstream separator 200 of the delivery system 10 by slipping into the downstream separator 200. The downstream separator 200 is vertically above the upstream separator 100 and downstream of the upstream separator 100. The clamp assembly 17 of the vertical support 11 is positioned on the vertical tube 101 near the downstream separator 200 for suspending and centering the vertical tube 101 and the upstream separator 100 within the silo 1. The downstream separator 200 comprises a vertical tube 201 for conveying the pneumatic material flow 6 upwardly from the downstream separator 200. The downstream separator 200 selectively either separates the material from the airflow and deposits the separated material 3 into the silo 1 onto the separated material 3 deposited by the upstream separator 100; or else flows the pneumatic material flow 6 through the downstream separator 200, without separating the material from the airflow, and into the vertical tube 201.

The vertical tube 201, in the embodiment shown in FIG. 1, connects to a top separator 300 of the delivery system 10 that is vertically above both the upstream separator 100 and the downstream separator 200 and that is downstream of the downstream separator 200. The clamp assembly 18 of the vertical support 11 is positioned on the vertical tube 201 for suspending and centering the vertical tube 201 and the downstream separator 200 within the silo 1. The top separator 300 comprises an open cap 311 on the top of the top separator 300. The top separator 300 selectively either separates the material from the airflow and deposits the separated material 3 into the silo 1 onto the separated material 3 deposited by both the upstream separator 100 and the downstream separator 200; or else flows the pneumatic material flow 6 through the top separator 300, without separating the material from the airflow, toward the cap 311.

One embodiment of a material separator 150 of the present invention that is not a top separator, that, for the embodiment shown in FIG. 1, can be any separator of the delivery system 10 that is not the top separator 300, is shown in FIG. 3 and FIG. 4. A vertical tube 149 conveys the pneumatic material flow 6 upwardly, from upstream of the material separator 150, downstream into the material separator 150. For the embodiment shown in FIG. 1, the vertical tube 149 can be any of the vertical tube 14 or the vertical tube that any of the separators of the delivery system 10, that is not the top separator 300, comprises.

The material separator 150 has an inlet 151, an outlet 152 below the inlet 151, and a cylindrical outlet tube 153 above the inlet 151. The outlet tube 153 is generally cylindrical in its entirety, and has the same outside diameter as the outside diameter of the vertical tube 149. For the embodiment shown in FIG. 1, the outlet tube 153 can be any of the vertical tube that any of the separators of the delivery system 10, that is not the top separator 300, comprises.

The material separator 150 includes an inlet tube 154 forming the inlet 151 at the upper end of the inlet tube 154. The lower end of the inlet tube 154 is below the outlet 152. The inside diameter of the inlet tube 154 is greater than the outside diameter of the vertical tube 149. The vertical tube 149 thus slips into the inlet tube 154 of the material separator 150.

The material separator 150 has a metal wall 155 that interconnects the outlet 152 and the outlet tube 153. The wall 155 forms a cylindrical base 156 and a forcing cone 157 above the cylindrical base 156. The inside diameter of the cylindrical base 156 is greater than the outside diameter of the inlet tube 154, forming the outlet 152 at the lower end of the cylindrical base 156. A plurality of webs 158, 159, 160, and 161 structurally interconnect and space apart the cylindrical base 156 and the inlet tube 154, thus together with the inlet tube 154 and the wall 155 interconnecting together the inlet 151, the outlet 152, and the outlet tube 153. The forcing cone 157 tapers upwardly and inwardly to the outlet tube 153, forming a through aperture 162 between the forcing cone 157 and the outlet tube 153. The inlet 151, the outlet 152, the inlet tube 154, the cylindrical base 156, essentially the entire forcing cone 157, and the webs 158, 159, 160, and 161 are all vertically below the through aperture 162 on the proximal side of the through aperture 162. Essentially the entire outlet tube 153 is vertically above the through aperture 162 on the distal side of the through aperture 162.

The material separator 150, the inlet 151, the outlet 152, the through aperture 162, the outlet tube 153, and the inlet tube 154 are coaxial. The relative sizes of the material separator 150 may be different based upon which specific granular material 3 is primarily to be delivered to the silo 1. For example, for grain, in the embodiment of the material separator 150 as shown in FIG. 3 and FIG. 4, the cylindrical base 156 has an inside diameter about three times the outside diameter of the inlet tube 154, and the axial distance between the outlet 152 and the through aperture 162 is approximately six times the diameter of the inlet 151.

One embodiment of the top separator 300 of the present invention is shown in FIG. 5 and FIG. 6. A vertical tube 299 conveys the pneumatic material flow 6 upwardly, from upstream of the top separator 300, downstream into the top separator 300. The vertical tube 299 shown in FIG. 5 and FIG. 6 conveys the pneumatic material flow 6 from the uppermost material separator 150 of the delivery system 10 that is not the top separator 300. For the embodiment shown in FIG. 1, the vertical tube 299 shown in FIG. 5 and FIG. 6 is the vertical tube 201 shown in FIG. 1 that the downstream separator 200 (which is the uppermost separator that is not the top separator 300) of the delivery system 10 comprises.

The top separator 300 has an inlet 301, a first outlet 302 below the inlet 301, and a second outlet 303 above the inlet 301. The vertical tube 299 extends into and terminates within the top separator 300 forming the inlet 301 at the upper end of the vertical tube 299.

The top separator 300 has a metal wall 304 that interconnects the first outlet 302 and the second outlet 303. The wall 304 forms a cylindrical base 305 and a cone 306 above the cylindrical base 305. The inside diameter of the cylindrical base 305 is greater than the outside diameter of the vertical tube 299, forming the first outlet 302 at the lower end of the cylindrical base 305. A plurality of webs 307, 308, 309, and 310 structurally interconnect and space apart the cylindrical base 305 and the vertical tube 299, thus together with the vertical tube 299 and the wall 304 interconnecting together the inlet 301, the first outlet 302, and the second outlet 303. The cone 306 tapers upwardly and inwardly to a diameter about two times the diameter of the inlet 301 at the second outlet 303.

An open cap 311 is at the second outlet 303 and has a stem 312. A plurality of webs 313, 314, 315, and 316 interconnect and space apart the stem 312 and the cone 306 at the second outlet 303, centering the stem 312 into the second outlet 303. The open cap 311 is mushroom shaped, blocking continued vertical flow, and redirects any flow through the second outlet 303 downwardly and out of the top separator 300.

The top separator 300, the inlet 301, the first outlet 302, and the second outlet 303 are coaxial. The relative sizes of the top separator 300 may be different based upon which specific granular material 3 is primarily to be delivered to the silo 1. For example, for grain, in the embodiment of the top separator 300 as shown in FIG. 5 and FIG. 6, the cylindrical base 305 has an inside diameter about three times the outside diameter of the vertical tube 299. The overall height of the top separator 300 is about six times the diameter of the inlet 301.

Figure 7:
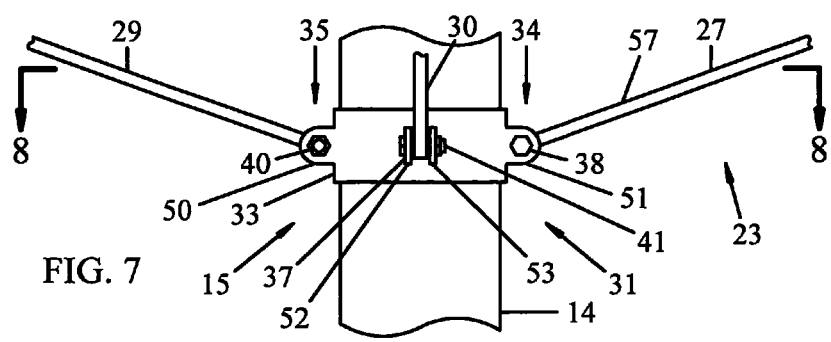
FIG. 7 is a side view, partly broken, of one embodiment of a clamp assembly and braces of the vertical support.

The clamp assemblies of the vertical support 11 are identical with each other; and, as such, the clamp assembly 15 is typical. The clamp assembly 15 is shown in greater detail in FIG. 7, FIG. 8, and FIG. 9.

The clamp 31 of the clamp assembly 15 has an inside circumference less than the outside circumference of the vertical tube 14. The clamp 31 is composed of metal plate or metal casting. The clamp 31 is a union of the two equal half clamps 32 and 33.

The half clamp 32 has an outwardly radiating end flange 46 on one end for forming the end bracket 34, and an outwardly radiating end flange 47 on the other end for forming the end bracket 35. The half clamp 32 has one or more of the side brackets 36 evenly spaced between the ends of the half clamp 32. Each side bracket 36 has two flanges 48 and 49 closely spaced to, and parallel with, each other. Each side bracket 36 has one aligning through hole formed by aligned holes in the flanges 48 and 49 thereof.

The half clamp 33 has an outwardly radiating end flange 50 on one end for forming the end bracket 35, and an outwardly radiating end flange 51 on the other end for forming the end bracket 34. The half clamp 33 has one or more of the side brackets 37 evenly spaced between the ends of the half clamp 33. Each side bracket 37 has two flanges 52 and 53 closely spaced to, and parallel with, each other. Each side bracket 37 has one aligning through hole formed by aligned holes in the flanges 52 and 53 thereof.

Figure 8:
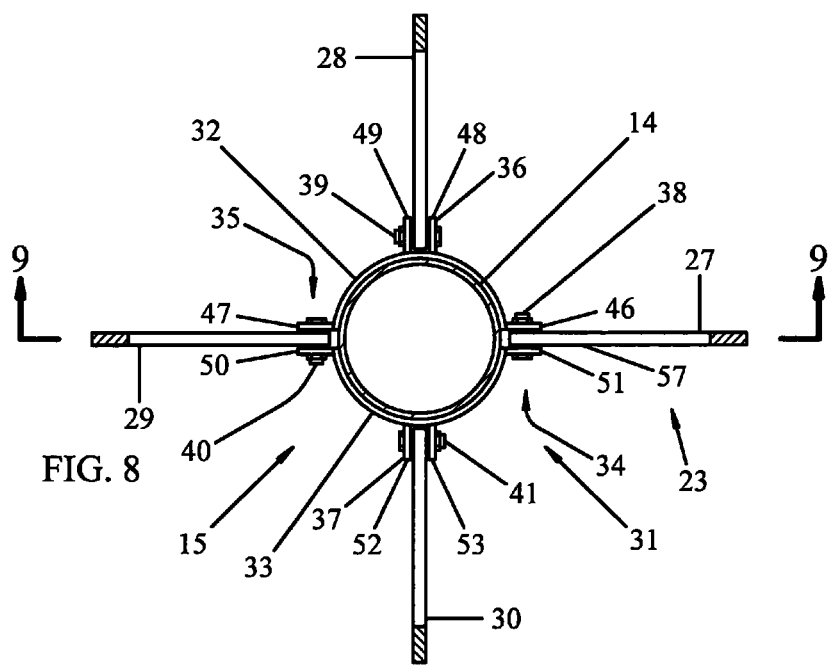
FIG. 8 is a cross-sectional view taken on line 8-8 in FIG. 7.
Figure 9:
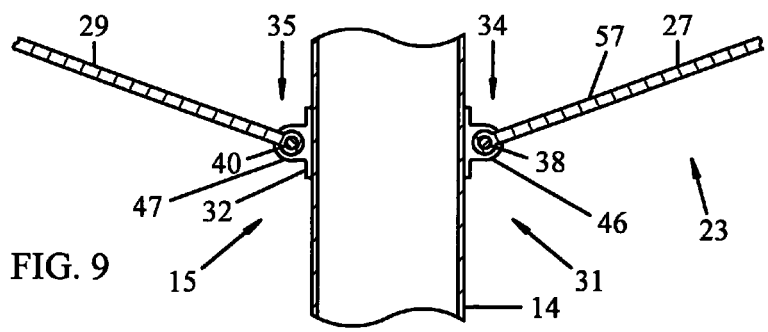
FIG. 9 is a cross-sectional view, partly broken, taken on line 9-9 in FIG. 8.

When the half clamps 32 and 33 are mounted onto the vertical tube 14, as shown in FIG. 8, the end flange 46 of the half clamp 32 and the end flange 51 of the half clamp 33 are adjacent to each other, forming the end bracket 34; and the end flange 47 of the half clamp 32 and the end flange 50 of the half clamp 33 are adjacent to each other, forming the end bracket 35. An aligning through hole of the end bracket 34 is formed by aligned holes in the end flanges 46 and 51, respectively. An aligning through hole of the end bracket 35 is formed by aligned holes in the end flanges 47 and 50, respectively.

The wall brackets of the vertical support 11 are identical with each other; and the wall bracket 19, as typical thereof, is shown in greater detail in FIG. 10 and FIG. 11. The wall bracket 19 is a metal or metal casting fixture. The wall bracket 19 has a base 54 and two parallel flanges 55 and 56. Each of the flanges 55 and 56 have aligned holes, forming an aligning through hole. The base 54 of wall bracket 19 has two or more holes. The wall bracket 19 is mechanically fastened or bolted to the silo wall 2.

The sets of the braces of the vertical support 11 are identical with each other. The brace 27, being typical of the braces, is shown in greater detail in FIG. 7 through FIG. 11. The brace 27 is a metal rod or cable having two end holes, one each for the inner end 57 and the outer end 58 thereof, for receiving the fasteners or bolts 38 and 42. The clamp end bracket 34 receives the inner end 57 of the brace 27 and retains the inner end 57 therein by the bolt 38 passing through the aligning through hole of the clamp end bracket 34 and the inner end hole of the brace 27. The wall bracket 19 receives the outer end 58 of the brace 27 and retains the outer end 58 therein by the bolt 42 passing through the aligning through hole of the wall bracket 19 and the outer end hole of the brace 27.

Another embodiment of the present invention has a support system that supports a delivery system that has a horizontal section and a vertical section and at least an elbow interconnecting the horizontal and vertical sections that together comprise a series of tubes and separators within a vertical storage silo having a wall and a floor. The delivery system may be generally identical to the delivery system 10 of the embodiment of the present invention hereinbefore described and as shown in FIG. 1 through FIG. 11, and similarly comprises the horizontal section having a horizontal tube, the elbow, and the vertical section having vertical tubes and separators. The delivery system delivers granular material to the silo for removably storing the material, and may so deliver generally identically to the delivery system 10. The delivery system so delivers the material when the material is transported by a conveyor entraining the material within a flow of fluid, as, in accordance with one embodiment of the present invention, a conventional pneumatic conveyor system, having a pneumatic transfer tube, that entrains the material within a flow of air, as a pneumatic material flow, for depositing the material into the silo. The delivery system comprises an outlet of the conveyor system. The silo, the material, and the pneumatic conveyor system may be generally identical to the silo 1, the material 3, and the pneumatic conveyor system 5, respectively, hereinbefore described in reference to FIG. 1 through FIG. 11. The support system, not shown, comprises a vertical support and a horizontal support. The vertical support suspends and centers the delivery system within the silo, and reinforces the silo against collapse. The horizontal support selectively supports the delivery system upon the floor of the silo. The supported weight and forces of the delivery system and the material when stored within the silo are distributed between the vertical support and the horizontal support. The vertical support has a plurality of clamp assemblies mounted on the vertical tubes of the vertical section of the delivery system, wall brackets on the silo wall, and sets of braces interconnecting the clamp assemblies, respectively, with the wall brackets on the silo wall, thereby suspending and centering the vertical tubes and the separators of the delivery system within the silo. The silo wall is thus interconnected throughout and within the silo by the vertical support, simultaneously reinforcing the silo wall against collapse of the silo as well as supporting the delivery system. The clamp assemblies, the sets of braces, and the wall brackets of the vertical support are generally identical to the clamp assemblies, the sets of braces, and the wall brackets of the embodiment of the present invention hereinbefore described and as shown in FIG. 1 through FIG. 11. The horizontal support has a plurality of clamp assemblies mounted on the horizontal tube of the horizontal section of the delivery system, a subframe interconnecting and reinforcing a horizontal elbow clamp assembly and a vertical elbow clamp assembly, and sets of removable support legs for selectively supporting the delivery system upon the floor of the silo that may be placed in stored positions thereof on the horizontal support to provide an unobstructed floor area for mechanical or manual sweeping of the silo floor.

Another embodiment of the present invention comprises bin sweep bumpers, not shown, to protect a mechanical bin sweep from damage, when the mechanical bin sweep is moving during the emptying of the silo, due to impacting against the removable support legs of the horizontal support when in deployed positions thereof.

Another embodiment of the present invention comprises a deflector, not shown, that protects the horizontal section of the delivery system from damage, as by crushing of the horizontal tube thereof, that may occur during delivery of the material into the silo or settling of the material within the silo during storage thereof or during emptying of the material from the silo.

This description of the present invention is not intended to be limited to only metal materials. Plastic and rubber may also be substituted for any or all parts. The present invention also lends itself to colorful displays including confectionaries through the use of clear glass or clear plastic materials.

Operation

The delivery system 10 of the present invention operates to automatically sequentially fill the storage silo 1 with the material 3 when the material is transported to the silo 1 by a conveyor entraining the material within a flow of fluid. In the embodiment of the present invention shown in FIG. 1 through FIG. 11, that conveyor is the conventional pneumatic conveyor 5 that entrains the material within a flow of air for depositing the material 3 into the silo 1.

In one embodiment of the present invention that operates to automatically sequentially fill the storage silo 1 as shown in FIG. 12 and FIG. 13, FIG. 14, and FIG. 15, the pneumatic conveyor 5 operates at a relatively lower pressure. As the pneumatic conveyor 5 begins to convey the pneumatic material flow 6 into the delivery system 10, filling of the storage silo 1 commences. The horizontal tube 12 of the delivery system 10 receives the pneumatic material flow 6 from the pneumatic conveyor 5 and conveys the pneumatic material flow 6 into the silo 1. The elbow 13 directs the pneumatic material flow 6 from the horizontal tube 12 vertically into the vertical tube 14 that conveys the pneumatic material flow 6 upwardly and downstream within the silo 1.

Figure 12:
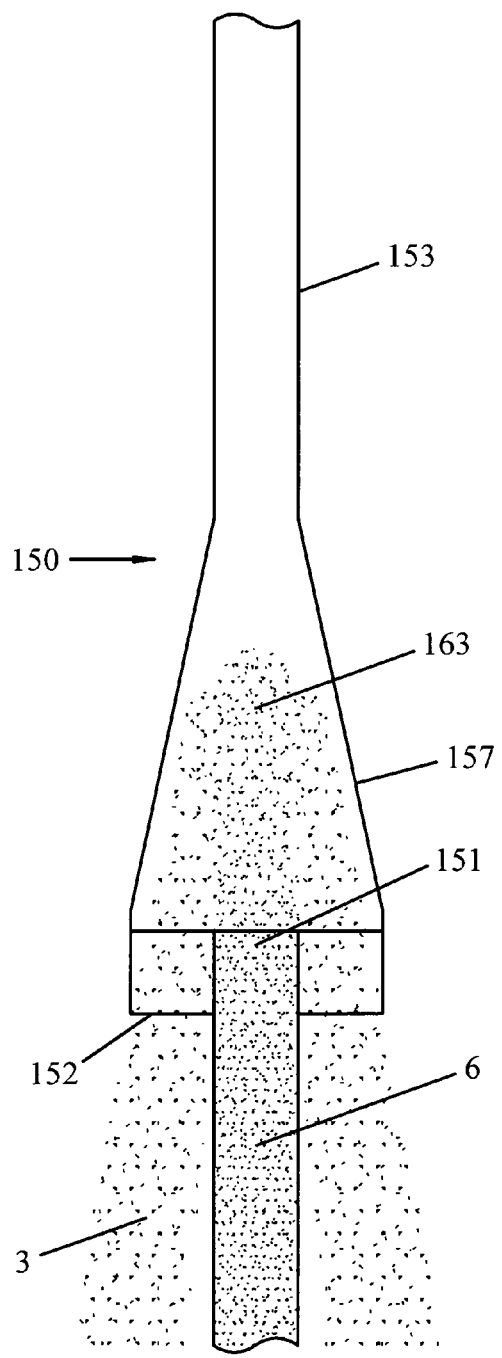
FIG. 12 is a schematic view, partly broken, of the embodiment of the present invention, as shown in FIG. 1, showing one embodiment of operation of the separator as shown in FIG. 3.

In this one embodiment of the present invention, the vertical tube 14 conveys the pneumatic material flow 6 upwardly and downstream into the first material separator 150 of the delivery system 10, which in the embodiment shown in FIG. 13 is the upstream separator 100. As shown in FIG. 12, the pneumatic material flow 6 expands from the inlet 151 into the increased diametric volume of the forcing cone 157 within the material separator 150. Insufficient air pressure results in a choking action 163 within the material separator 150, specifically within the volume of the forcing cone 157 of the material separator 150, separating the material 3 from the airflow. A flow of the separated material 3 is automatically deposited downwardly by gravity out of the material separator 150 through the outlet 152 and into the silo 1, forming a mound of the separated material 3 having a material surface 4. The airflow is rapidly released upwardly through the outlet tube 153 and also downwardly through the outlet 152. The released air is vented from the silo 1 through equalizing vents (not shown).

As the material separator 150, specifically the upstream separator 100, continues to separate the material 3 in accordance with the embodiment of the present invention as shown in FIG. 12, the flow of the separated material 3 raises the level of the material surface 4 within the silo 1 to eventually meet with and block the outlet 152 as shown in FIG. 14. This blocking of the outlet 152 automatically stops the flow, and the depositing, of the separated material 3 being deposited out of the material separator 150 through the outlet 152 into the silo 1. The air pressure within the material separator 150 rises to be sufficient for continued downstream conveying, automatically stopping the separating within the material separator 150. The pneumatic material flow 6 reestablishes within the material separator 150.

The outlet tube 153, which in the embodiment shown in FIG. 1 is the vertical tube 101, conveys the reestablished pneumatic material flow 6 upwardly and downstream into the material separator 150 of the delivery system 10 that is the next material separator 150 that is downstream of the first material separator 150. In the embodiment shown in FIG. 14, that next material separator 150 is the downstream separator 200. The downstream separator 200, which is that next material separator 150, then separates the material 3 from the airflow in the identical operation as that of the previous material separator 150 (the upstream separator 100 in the embodiment shown in FIG. 13) shown in FIG. 12. As shown in FIG. 15, the flow of the separated material 3 is deposited out of the downstream separator 200 onto the mound of the material 3 that had been deposited out of the upstream separator 100, the separated material 3 falling at most only as far as the previous material separator 150 (the upstream separator 100 in the embodiment shown in FIG. 14), again raising the level of the material surface 4.

This operation of separating the material, flowing the material, depositing the material, then stopping the flowing and the depositing of the material by blocking the outlet, and then reestablishing the pneumatic material flow 6 to convey upwardly the pneumatic material flow 6 into the next material separator 150 that is downstream is repeated for each of the material separators 150 of the delivery system 10 in sequence from the bottom of the silo 1 to the top of the silo 1. The final separator in this sequence is the top separator 300, which operates similarly as all the other material separators 150 operate. The cap 311 redirects any flow through the second outlet 303 of the top separator 300 downwardly and out of the top separator 300 into the silo 1.

In another embodiment of the present invention that operates to automatically sequentially fill the storage silo 1 as shown in FIG. 16 and FIG. 17, FIG. 18, and FIG. 19, the pneumatic conveyor 5 operates at a relatively higher pressure. Again, as the pneumatic conveyor 5 begins to convey pneumatic material flow 8, which is identical to the pneumatic material flow 6 except that the airflow from the blower of the pneumatic conveyor 5 is at the relatively higher pressure, into the delivery system 10, filling of the storage silo 1 commences. The horizontal tube 12 of the delivery system 10 receives the pneumatic material flow 8 from the pneumatic conveyor 5 and conveys the pneumatic material flow 8 into the silo 1. The elbow 13 directs the pneumatic material flow 8 from the horizontal tube 12 vertically into the vertical tube 14 that conveys the pneumatic material flow 8 upwardly and downstream within the silo 1.

Figure 16:
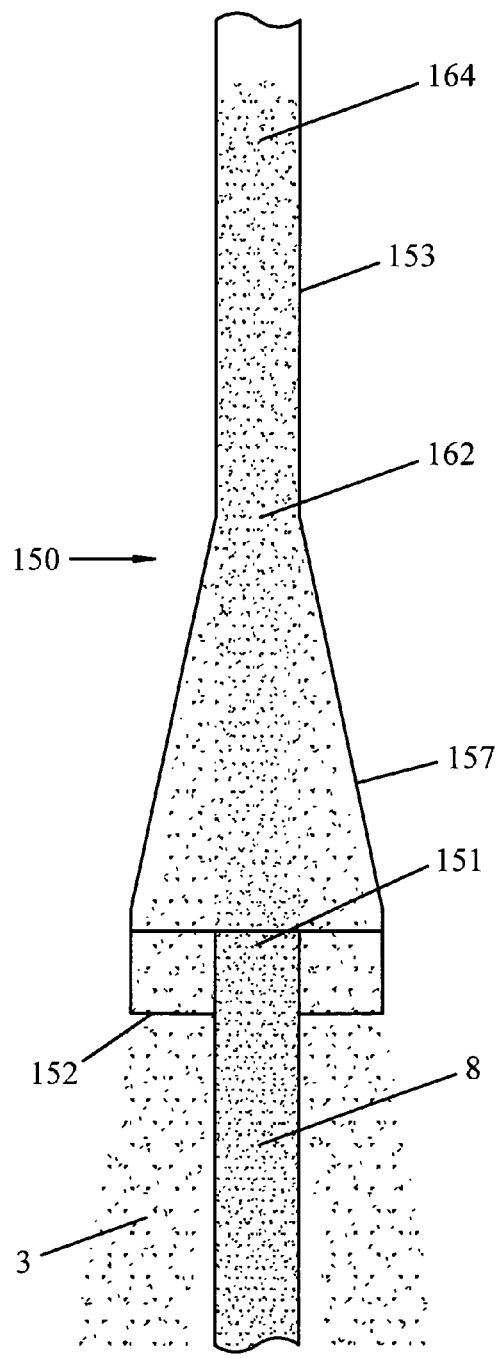
FIG. 16 is a schematic view, partly broken, of the embodiment of the present invention, as shown in FIG. 1, showing another embodiment of operation of the separator as shown in FIG. 3.

In this other embodiment of the present invention, the vertical tube 14 conveys the pneumatic material flow 8 upwardly and downstream into the first material separator 150 of the delivery system 10, which in the embodiment shown in FIG. 17 is the upstream separator 100. As shown in FIG. 16, the pneumatic material flow 8 continues approximately unchanged from the inlet 151 into the increased diametric volume of the forcing cone 157 within the material separator 150 to the through aperture 162, expanding by only a small percentage. Most of the pneumatic material flow 8 flows through the through aperture 162 upwardly to the distal side of the through aperture 162 into the cylindrical volume of the outlet tube 153 of the material separator 150. Insufficient air pressure results in a choking action 164 within the material separator 150, specifically within the cylindrical volume of the outlet tube 153 of the material separator 150, separating the material 3 from the airflow, automatically resulting in a gravimetric flow of the separated material 3 downwardly within the cylindrical volume of the outlet tube 153, through the through aperture 162 to the proximal side of the through aperture 162, and downwardly within the volume of the forcing cone 157. The flow of the separated material 3 is downwardly through an outer annular portion of the through aperture 162 simultaneously with the pneumatic material flow 8 that is upwardly through an inner central portion of the through aperture 162 as shown in FIG. 16. The outer annular portion and the inner central portion are generally coaxial with the through aperture 162. The flow of the separated material 3 is automatically deposited downwardly by gravity out of the material separator 150 through the outlet 152 and into the silo 1, forming a mound of the separated material 3 having a material surface 9. The airflow is rapidly released upwardly through the upper portion of the outlet tube 153; some of the airflow is also released downwardly through the outlet 152. The released air is vented from the silo 1 through equalizing vents (not shown).

As the material separator 150, specifically the upstream separator 100, continues to separate the material 3 in accordance with the embodiment of the present invention as shown in FIG. 16, the flow of the separated material 3 raises the level of the material surface 9 within the silo 1 to eventually meet with and block the outlet 152 as shown in FIG. 18. This blocking of the outlet 152 automatically stops the flow, and the depositing, of the separated material 3 being deposited out of the material separator 150 through the outlet 152 into the silo 1. The air pressure within the material separator 150 rises to be sufficient for continued downstream conveying, automatically stopping the separating within the material separator 150. The pneumatic material flow 8 reestablishes within the material separator 150.

The outlet tube 153, which in the embodiment shown in FIG. 1 is the vertical tube 101, conveys the reestablished pneumatic material flow 8 upwardly and downstream into the material separator 150 of the delivery system 10 that is the next material separator 150 that is downstream of the first material separator 150. In the embodiment shown in FIG. 18, that next material separator 150 is the downstream separator 200. The downstream separator 200, which is that next material separator 150, then separates the material 3 from the airflow in the identical operation as that of the previous material separator 150 (the upstream separator 100 in the embodiment shown in FIG. 17) shown in FIG. 16. As shown in FIG. 19, the flow of the separated material 3 is deposited out of the downstream separator 200 onto the mound of the material 3 that had been deposited out of the upstream separator 100, the separated material 3 falling at most only as far as the previous material separator 150 (the upstream separator 100 in the embodiment shown in FIG. 18), again raising the level of the material surface 9.

This operation of separating the material, flowing the material, depositing the material, then stopping the flowing and the depositing of the material by blocking the outlet, and then reestablishing the pneumatic material flow 8 to convey upwardly the pneumatic material flow 8 into the next material separator 150 that is downstream is repeated for each of the material separators 150 of the delivery system 10 in sequence from the bottom of the silo 1 to the top of the silo 1. The final separator in this sequence is the top separator 300, which operates in accordance with the embodiment of present invention shown in FIG. 12 as hereinbefore described. The cap 311 redirects any flow through the second outlet 303 of the top separator 300 downwardly and out of the top separator 300 into the silo 1.

Thus, for each separator, in each of the two embodiments of the present invention of operating thereof, the separator functions selectively in either one of two modes of operation. In one mode of operation, the separator separates the material from the airflow entraining the material and flows the separated material through the outlet thereof. In another mode of operation, the airflow entraining the material flows through the separator without separating the material therefrom and without flowing separated material through the outlet thereof. The selection between the two modes of operation is automatic, based on whether the surface of the mound of the deposited material does or does not block the outlet of the separator through which the separated material is deposited onto the mound. The selectively separating and selectively flowing requires no moving parts. Thus, for each separator, the separator selectively separates the material and selectively flows the separated material into the silo to sequentially fill the silo up to the height that the separator is located within the silo.

Further, the vertical support has a plurality of the clamp assemblies to suspend and center the series of the tubes and the separators of the delivery system of the present invention. Simultaneously, the clamp assemblies, with the sets of braces thereof and the respective wall brackets, reinforce the silo wall against collapse of the silo by resisting the bowing outwards of the silo wall from the weight of the delivery system, the weight and any movement of the stored granular material within the silo, etc.; and, if the braces are rods, by also resisting the bowing inwards of the silo wall therefrom. The clamp assemblies are structurally attached to the silo wall through the sets of braces and the plurality of brackets to distribute pressure. The distribution of the wall brackets throughout the silo provides even weight transfer to the silo wall. The two equal half clamps of the clamps of the clamp assemblies simplify construction. The clamps of the clamp assemblies provide for even load transfer and stabilization through the application of opposing clamp brackets. Suspension of the delivery system of the present invention within the silo also provides an unobstructed floor area for mechanical or manual sweeping.

In yet another embodiment of the present invention, the material stored within the storage silo, having a support system comprising a vertical support and a horizontal support, is removed therefrom when emptying the silo. In order to provide an unobstructed floor area for mechanical or manual sweeping of the silo floor, the removable support legs of the horizontal support of the support system are removed from the deployed positions thereof, and may be placed in the stored positions thereof on the horizontal support. The silo may be equipped with the bin sweep having the plurality of the bin sweep bumpers. When the silo is so equipped, the bin sweep is operated to continue to extract more of the material until, sequentially, one of the bumpers bumps into the next removable support leg that is still mounted in the deployed position thereof, the bin sweep is then stopped, the bumped-into removable support leg is removed from the deployed position thereof, which then may be placed in the stored position thereof, and the bin sweep is again operated to continue to extract more of the material, until all of the removable support legs that are in the deployed positions thereof are so removed which then may be so placed stored. Afterwards, the silo floor is unobstructed by the removable support legs of the horizontal support of the support system, and the bin sweep can be operated without damage thereto, and/or manual sweeping can occur, to continue to extract more of the material from the silo.

I claim:

1. A method of delivering material being transported by a conveyor entraining the material within a flow of fluid, wherein said method comprises:

flowing the fluid flow entraining the material into a separator, comprising an inlet, an outlet tube, at least a wall for interconnecting the inlet and the outlet tube, a through aperture between the wall and the outlet tube, and an outlet, through the inlet thereof, wherein the separator, the inlet, the outlet, the through aperture, and the outlet tube are coaxial, and wherein the inlet, the outlet, and essentially entirely the wall are on a proximal side of the through aperture and essentially entirely the outlet tube is on a distal side of the through aperture;

flowing at least a portion of the fluid flow entraining the material through the through aperture and within the outlet tube of the separator;

separating the material from the fluid flow within the outlet tube of at least the portion of the fluid flow entraining the material therewithin, wherein said separating comprises choking the portion of the fluid flow entraining the material within the outlet tube of the separator; and depositing the material from said separating out of the separator through the outlet thereof.

2. The method of claim 1, further comprising flowing the fluid flow entraining the material approximately unchanged from the inlet to the through aperture.

3. The method of claim 1, further comprising flowing the material from said separating vertically downwardly through an outer portion of the through aperture to the proximal side thereof;

wherein said flowing at least the portion of the fluid flow entraining the material comprises flowing at least the portion of the fluid flow entraining the material vertically upwardly through an inner portion of the through aperture to the distal side thereof into the outlet tube of the separator; and wherein said flowing vertically downwardly through the outer portion of the through aperture to the proximal side thereof and said flowing vertically upwardly through the inner portion of the through aperture to the distal side thereof are simultaneous.

4. The method of claim 1, further comprising selecting either to separate the material from the fluid flow by said separating and to deposit the material from said separating by said depositing or else to flow the fluid flow entraining the material through the separator through the outlet tube thereof without separation of the material from the fluid flow therewithin;

wherein said separating comprises selectively separating the material from the fluid flow within the outlet tube of at least the portion of the fluid flow entraining the material therewithin only when said selecting is selecting to separate and to deposit.

5. The method of claim 4, wherein the separator is an upstream separator and said depositing forms a mound of the material, and said method further comprises:

stopping said selectively separating and said depositing by said selecting to be selecting to flow;

reestablishing the fluid flow entraining the material through the upstream separator;

flowing the fluid flow entraining the material into a downstream separator that is downstream of the upstream separator;

separating the material from the fluid flow within the downstream separator; and depositing the material, from said separating within the downstream separator, out of the downstream separator onto the mound of the material.

6. A system for delivering material being transported by a conveyor entraining the material within a flow of fluid, wherein said system comprises:

a separator; and a tube connected to said separator for receiving the fluid flow entraining the material and for conveying the fluid flow entraining the material to said separator;

wherein said separator comprises an inlet for the fluid flow entraining the material from said tube, an outlet tube, at least a wall for interconnecting said inlet and said outlet tube, a through aperture between said wall and said outlet tube for at least flowing a portion of the fluid flow entraining the material therethrough to be within said outlet tube, means for separating the material from the fluid flow within said outlet tube of at least the portion of the fluid flow entraining the material therewithin, and means for depositing the material from said separating means out of said separator;

wherein said separating means comprises means for choking the portion of the fluid flow entraining the material within said outlet tube;

wherein said separator, said inlet, said depositing means, said through aperture, and said outlet tube are coaxial; and wherein said inlet, said depositing means, and essentially entirely said wall are on a proximal side of said through aperture and essentially entirely said outlet tube is on a distal side of said through aperture.

7. The system of claim 6, wherein said outlet tube is generally entirely cylindrical.

8. The system of claim 6, wherein said choking means comprises said tube for receiving the fluid flow entraining the material and said separator being vertically oriented with said outlet tube being above said inlet.

9. The system of claim 6, wherein said separator further comprises means for selecting either to separate the material from the fluid flow by said separating means and to deposit the material from said separating means by said depositing means or else to flow the fluid flow entraining the material through said separator through said outlet tube thereof without separation of the material from the fluid flow therewithin; and wherein said separating means comprises means for selectively separating the material from the fluid flow within said outlet tube of at least the portion of the fluid flow entraining the material therewithin only when said selecting means is selecting to separate and to deposit.

10. The system of claim 9, wherein said selecting means comprises means for automatically selecting either to separate the material from the fluid flow by said selectively separating means and to deposit the material from said selectively separating means by said depositing means or else to flow the fluid flow entraining the material through said separator through said outlet tube thereof without separation of the material from the fluid flow therewithin; and wherein said automatically selecting means comprises said depositing means comprising an outlet through which the material from said selectively separating means flows out of said separator, forming a mound of the material having a surface so that said automatically selecting means is selecting to separate and to deposit, only until the surface of the mound blocks said outlet so that said automatically selecting means is selecting to flow.

11. The system of claim 10, wherein said separator is an upstream separator, and said system further comprises a downstream separator that is downstream from and connected to said outlet tube for separating the material from the fluid flow when said automatically selecting means is selecting to flow.

12. The system of claim 11, wherein said system delivers the material to a storage comprising a wall, said upstream separator and said downstream separator are within the storage, and said system further comprises:
- a support suspending said system within the storage, said support comprising a plurality of clamp assemblies each mounted on any one of said tubes and a set of braces for each respective said clamp assembly for interconnecting said respective clamp assembly and the storage wall;
- wherein said tubes and said separators are vertically oriented within the storage with said outlet tube being above said inlet, and said support vertically suspends said system within the storage;
- whereby said system automatically sequentially fills the storage as initially said upstream separator is selectively separating the material by said selectively separating means onto the mound until the surface of the mound blocks said outlet so that said automatically selecting means is selecting to flow, and then subsequently said downstream separator is separating the material onto the mound.

* * * * *